United States Patent [19]
Pierce

[11] 3,918,921
[45] Nov. 11, 1975

[54] PROCESS FOR MAKING GRANULAR HYDRATED ALKALI METAL SILICATE

[75] Inventor: Richard H. Pierce, Broomall, Pa.

[73] Assignee: Philadelphia Quartz Company, Valley Forge, Pa.

[22] Filed: Aug. 29, 1973

[21] Appl. No.: 392,702

Related U.S. Application Data

[63] Continuation of Ser. No. 143,627, May 14, 1971, abandoned.

[52] U.S. Cl. ......... 23/313 AS; 252/135; 23/313 FB; 264/117; 423/332
[51] Int. Cl.² B01F 3/06; C01B 33/32; C01D 11/00
[58] Field of Search ...... 23/313 AS, 313 FB, 302 R; 264/117; 252/527, 135; 423/332; 159/48

[56] References Cited
UNITED STATES PATENTS

| | | | |
|---|---|---|---|
| 1,198,203 | 9/1916 | Edgerton | 23/313 AS |
| 1,517,891 | 12/1924 | Dickerson | 23/313 AS |
| 2,941,947 | 6/1960 | Schauer | 23/313 AS |
| 3,208,822 | 9/1965 | Baker | 23/313 AS |
| 3,340,018 | 9/1967 | Otrhalek | 23/313 AS |
| 3,687,640 | 8/1972 | Sams | 23/313 AS |
| 3,714,051 | 1/1973 | Milesi | 23/313 AS |
| 3,748,103 | 7/1973 | Bean | 23/313 AS |

FOREIGN PATENTS OR APPLICATIONS

| | | | |
|---|---|---|---|
| 1,045,682 | 10/1966 | United Kingdom | 23/313 AS |

*Primary Examiner*—Norman Yudkoff
*Assistant Examiner*—S. T. Emery
*Attorney, Agent, or Firm*—Fred C. Philpitt; Ernest Posner

[57] ABSTRACT

Readily soluble hydrated alkali metal silicate granules are prepared by a change in the spray drying process. The fine particles produced by spray drying are recycled through the spray dryer so that agglomerates are formed.

5 Claims, No Drawings

PROCESS FOR MAKING GRANULAR HYDRATED ALKALI METAL SILICATE

This is a continuation of application Ser. No. 143,627, filed May 14, 1971, now abandoned.

INTRODUCTION

Powdered or granulated readily soluble hydrated alkali metal silicate products, other than spray dried or crystallized materials, have generally been unavailable as commercial products because of problems such as caking, related to a lack of equilibrium in the moisture contained by the silicates. The spray dried materials also have disadvantages, the particles produced are generally very small and fairly dense. If the preparation of larger particles is attempted by spray drying the products are apt to be hollow microballoons with a fragility and low bulk density that renders them unsuitable for storage, shipping and processing. The crystalline silicates, for example, anhydrous sodium metasilicate, sodium metasilicate pentahydrate or sodium sesquisilicate, are useful with desirable particle sizes and bulk densities, but their low silica to alkali ratio makes them unnecessarily caustic for many applications and they must be handled with care. Also, in household detergents silicates with ratios of silica to alkali greater than 1 contribute to better detergency.

I have found that by modifying the spray drying process hydrated amorphous alkali metal silicate agglomerates of relatively high bulk density and large particle size can be prepared. The process involves injecting the fine but relatively dense particles that are normally produced in spray drying operations back into the spray dryer through a dust nozzle. As these particles fall through the dryer they encounter droplets of alkali metal silicate solution that have been atomized into the dryer. These adherent particles agglomerate as they dry and larger particles are formed. If still larger particles are required the particles can be recycled until the desired particle size is attained. The product of this process is a hydrated alkali metal silicate granule of large particle size and relatively high bulk density. These products are useful in any application of the present spray dried products but are particularly useful in detergents and cleaner blends where a larger particle size is desired.

THE INVENTION

The solutions to be dried in practicing this invention can be of any alkali metal silicate with a mole ratio of $SiO_2/M_2O$ of 1.2/1.0 to 4.0/1.0 in which M stands for an alkali metal or metals. Most commonly, sodium or potassium silicate solutions are used, but combinations of sodium and potassium silicate solutions can also be used if desired. Examples of useful silicate solutions are:

| Silicate | Ratio $SiO_2/M_2O$ Wt. Ratio | Mole Ratio |
|---|---|---|
| B-W | 1.6 | 1.65 |
| RU | 2.4 | 2.47 |
| K | 2.9 | 2.97 |
| N | 3.2 | 3.30 |
| S 35 | 3.8 | 3.92 |
| Kasil No. 6 | 2.1 | 3.29 |
| Kasil No. 1 | 2.5 | 3.92 |

B-W, RU, K, N, S 35 and Kasil are registered trademarks of the Philadelphia Quartz Company.

The type and size of the spray dryer is not of great importance except that the dryer should be large enough and have a path of sufficient length to dry the silicate without subjecting it to extremely high temperatures. The limitation on the temperature exposure is necessary for a number of reasons. If the temperature is too high the recycled particles may become overdried and difficult to dissolve completely, also the particles of alkali metal silicate solution may puff up and thereby the density of the particles decreased so that they are not as useful. The inlet temperature of the gasses in the dryer can be from 250° to 500°F and the outlet temperature can be 160° to 250°F. The gas flow can be co-current or countercurrent with the particle flow or the gas flow can be mixed.

The alkali metal silicate solutions are atomized into the dryer at about the outlet temperature of the gas. The solutions are heated or diluted to reduce the relatively high viscosity that prevails at room temperature or high concentrations so that the solution can be readily pumped and atomized. It is important that the atomization be uniform in both the size of the drops formed and in the pattern of the drops in the tower so that the final particle size of the product is uniform.

The material that is exhausted from the dryer is conducted through a collecting cyclone where the agglomerated particles are collected. The fine particles that have not been agglomerated continue in the air stream and are recycled through the dryer. The collected product with the desired particle size is discharged into a tumbling or contact cooler in which it is cooled until the particles are no longer adherent and do not cake. The amount of product removed from the particle stream exhausted from the dryer depends upon the particle size desired. At small particle sizes a larger proportion of the particle stream can be collected. To obtain large particle sizes more recycling is necessary. The feed of alkali metal silicate is adjusted so that it adds about the same amount of silicate solids that are removed as product to maintain a steady state. The particle size can be conveniently controlled by controlling the air flow through the collecting cyclone. If the air flow is fast only the larger particles will be separated out, but if the air flow is slow more of the finer particles will be separated.

The fine particles that are not collected in the cyclone are conducted back to the top of the spray dryer. They are injected into the dryer just above the jet nozzle or atomizer wheel that is dispersing the silicate solution. In this way the falling particles contact the drops of solution as they fall through the spray.

The particle size of the product can be varied to produce almost any desired size range such as 10 to 65 mesh, 10 to 48 mesh, 10 to 100 mesh, 20 to 48 mesh, etc. particles. These hydrated alkali metal silicate particles can have a bulk density of 20 to 55 lbs/cu.ft. depending on the particle size and water content of the material. The products are freeflowing, non-dusting and do not cake under moderate pressure indicating that the water contained by the granules is well equilibrated. The moisture content of the granules can be varied from 10 to 30%. The products dissolve rapidly with very low insoluble content.

These granular products are useful in detergent mixtures in which they can be blended with other granular and, optionally, smaller amounts of liquid ingredients to furnish non-caking, non-segregating detergent formulations. These products are particularly useful in dry blended detergents in which phosphates have been replaced with other chelating agents. In these formulations the silicate serves a number of functions. It is a detergent builder, corrosion control agent, and it can be hydrated, carrying the water that the phosphate would normally carry. These hydrated silicate products are also useful in detergent formulations containing water to be spray dried. The readily water soluble character of these products makes them useful in numerous applications in solutions such as water treatment, corrosion prevention, brick manufacture, buffering and deflocculating but where a more handable solid would be an advantage.

EXAMPLES

A better understanding of the invention can be obtained from the following illustrative examples which should not be considered restrictive.

The spray dryer used in these examples was 7.5 feet in diameter and 25 feet in height with an atomizer wheel. The drops and/or particles have a residence time of about 1.5 to 3.0 seconds. The hot inlet gasses enter near the bottom of the dryer, spiral upward and exit at the top. Gas fired burners with air fans are used to heat the burner.

EXAMPLE 1

A sodium silicate solution with a mole ratio of 2.0 $SiO_2/Na_2O$ and a silicate solids content of 40% was heated to 190°F and pumped into the spray dryer at a rate of 490 pbw/hour. The atomizer was run at 7,000 RPM, the inlet temperature was 300°F and the outlet temperature was 200°F. The velocity of air through the collecting cyclone was about 200 feet/minute and no product was collected for 70 seconds which represented about four cycles through the spray dryer and the auxiliary equipment. Then the product began to collect at the rate of 245 pbw/hour. The particle size was 10 to 80 mesh (Tyler screen size) and the tamped bulk density was 42 lbs/cu.ft. The moisture content was 19.8%. The product dissolved with only 0.07% undissolved when 5g of the granules were dissolved in 95g of water at 70°F for 5 minutes.

EXAMPLE 2

A preparation similar to Example 1 was carried out except that the velocity of the air through the collecting cyclone was 250 ft/min. The product collected at the rate of 200 pbw/hour and the particle size was 10 to 48 mesh. The heated silicate at 50% silicate solids was pumped to the spray dryer at the rate of 320 pbw/hour, the inlet temperature was 280°F and the outlet temperature was 200°F. The product had a tamped bulk density of 42 lbs/cu.ft. and a moisture content of 22.1%. The product dissolved with less than 0.1% undissolved under the conditions of Example 1.

EXAMPLE 3

A preparation similar to Example 2 was carried out except that the velocity of the air through the collecting cyclone was 100 feet/minute. The product was collected at the rate of 310 pbw/hour and the particle size was 20 to 100 mesh. The heated silicate solution was pumped to the spray dryer at the rate of 500 pbw/hour, the inlet temperature was 325°F and the outlet temperature was 190°F. The product had a tamped bulk density of 59 lbs/cu.ft. and had a moisture content of 19.1%. The product dissolved with less than 0.1% undissolved under the conditions of Example 1.

EXAMPLE 4

A sodium silicate solution with a mole ratio of 2.4 $SiO_2/Na_2O$ and 40% silicate solids was heated to 185°F and pumped into the spray dryer. The atomizer wheel was run at 6,500 RPM, the inlet temperature was 310°F and the outlet temperature was 200°F. The velocity of air through the collecting cyclone was 200 ft/minute. After a short time the product began to collect at the rate of 210 pbw/hour so that the heated silicate solution was pumped to the dryer at 425 pbw/hour. The particle size of the product was 10 to 80 mesh and the tamped bulk density was 45 lbs/cu.ft. The moisture content was 18.7% and the product dissolved with less than 0.1% undissolved with less than 0.1% undissolved under the conditions of Example 1.

EXAMPLE 5

A mixed sodium-potassium silicate solution was prepared by combining sodium and potassium silicate solutions both having mole ratios of $SiO_2/M_2O$ of 3.92 in such proportions that the ratio of $Na_2O/K_2O$ was 9.0/1.0 and the solids content was 32%. The mixture was heated at 190°F and pumped into the spray dryer at the rate of 330 pbw/hour. The atomizer wheel was run at 7,000 RPM, the inlet temperature was 300°F and the outlet temperature was 190°F. The velocity of the air flow through the collecting cyclone was about 200 ft/minute. After a short time the product began to collect at the rate of 150 pbw/hour. The particle size was 10 to 80 mesh and the tamped bulk density was 47 lbs/cu.ft. The moisture content was 18.3% and the product dissolved with less than 0.1% undissolved under the test conditions of Example 1.

EXAMPLE 6

A dry blended laundry detergent of the following composition was prepared using the product of Example 4.

| | |
|---|---|
| Triton X-100(Nonionic surfactant; Rohm & Haas Corp) | 12.0 pbw |
| Sodium Nitrilotriacetic Acid Monohydrate (organic sequestering) agent) | 30.0 |
| Hydrated Sodium Silicate of Example 4 (2.4 $SiO_2/Na_2O$; 18.7% $H_2O$; 45 lbs/cu.ft.) | 36.0 |
| $Na_2CO_3$ | 21.0 |
| Sodium Carboxymethyl cellulose(anti-redeposition agent) | 1.0 |
| Blancophor CM(Optical brightener; GAF Corp) | 0.2 |
| Water | 7.0 |

The mixture was blended easily and none of the ingredients segregated from the mix. Also the mixture remained free-flowing. The mixture was an efficient handable laundry detergent compound that was non-corrosive to washing machine parts.

EXAMPLE 7

An automatic home dishwashing detergent of low phosphate content was prepared using the product of Example 1. The composition was:

| | |
|---|---|
| Sodium Tripolyphosphate | 33.0 pbw |
| Hydrated Sodium Silicate of Example 1 (2.0 $SiO_2/Na_2O$; 19.8% $H_2O$; 42 lbs/cu.ft.) | 54.8 |
| Sodium Nitrilotriacetic acid | 5.5 |

-continued

| | |
|---|---|
| Triton CF-54 (Nonionic surfactant; Rohm & Haas Corp) | 2.0 |
| CDB-60 (Solid Bleach, FMC Corp) | 1.7 |
| Water | 3.0 |

This mixture was simple to blend and was a effective dishwashing detergent.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. In the process for producing granules consisting essentially of a plurality of hydrated amorphous alkali metal silicate particles bonded together at touching surfaces, having an $SiO_2/M_2O$ mol ratio of 1.2 to 4.0/1.0, the improvement whereby said product is produced in a continuous spray drying process which results in a product having 10 to 30% equilibrated moisture and a tamped bulk density of 20 to 55 lbs/cu.ft. comprising:

a. maintaining a spray dryer with a gas inlet temperature of 250° to 500°F and a gas outlet temperature of 160° to 250°F;

b. injecting an atomized aqueous alkali metal silicate solution into said spray dryer so that apparently dry particles are formed during the passage through the spray dryer;

c. entraining said particles in a gas flowing at 100 to 250 ft/min;

d. conducting said entrained particles through a collection system wherein the particles having a particle size larger than about 100 mesh separate from the flowing gas by gravity because they are too large to remain entrained in said gas flow while the particles smaller than 100 mesh remain entrained in the gas flow;

e. injecting the gas flow with said entrained small particles smaller than 100 mesh into said spray dryer at a point above the injection point for the alkali metal silicate solution so that the falling particles encounter said atomized alkali metal silicate solution and agglomerates are formed, and f. maintaining the feed rate of said alkali metal silicate solution such that the solids injected into the spray dryer are equal to the product solids removed in the collection system.

2. The process of claim 1 in which the alkali metal silicate solution is selected from a group consisting of sodium silicate and potassium silicate.

3. The process of claim 1 in which the velocity of the gas flowing through the collection system is 100 ft/min. and the product granules have a particle size range of 20 to 100 mesh.

4. The process of claim 1 in which the velocity of the gas flowing through the collection system is 200 ft/min. and the product granules have a particle size range of 10 to 80 mesh.

5. The process of claim 1 in which the velocity of the gas flowing through the collection system is 250 ft/min. and the product granules have a particle size range of 10 to 48 mesh.

* * * * *